United States Patent [19]

Loucks

[11] Patent Number: 5,269,132
[45] Date of Patent: Dec. 14, 1993

[54] METHOD AND APPARATUS FOR CONTROLLING INFRARED EMISSIONS

[75] Inventor: Kenneth W. Loucks, Greenville, Tex.

[73] Assignee: E-Systems, Inc., Dallas, Tex.

[21] Appl. No.: 968,503

[22] Filed: Oct. 29, 1992

[51] Int. Cl.$^5$ .............................. F02C 7/08; F02G 1/00
[52] U.S. Cl. ........................................ 60/204; 60/39.5;
   60/267; 60/271; 239/127.1; 239/127.3; 239/265.17
[58] Field of Search ............... 60/267, 271, 39.5, 204;
   89/14.2; 239/127.1, 127.3, 265.17

[56] References Cited

U.S. PATENT DOCUMENTS

| | | | |
|---|---|---|---|
| 759,803 | 5/1904 | Boucher et al. | 89/14.2 |
| 2,389,059 | 11/1945 | Kurth | 89/14.2 |
| 3,167,909 | 2/1965 | Thielman . | |
| 3,359,737 | 12/1967 | Lewis | 60/265 |
| 3,481,543 | 12/1969 | Lovingham | 239/127.3 |
| 3,595,023 | 7/1971 | Stockel | 239/127.3 |
| 3,605,412 | 9/1971 | Stockel | 60/260 |
| 3,684,054 | 8/1972 | Lemmerman | 60/39.5 |
| 3,695,515 | 10/1972 | Stockel | 239/127.1 |
| 3,782,116 | 1/1974 | Burge et al. | 60/258 |
| 3,815,356 | 6/1974 | Burge et al. | 60/204 |
| 3,815,360 | 6/1974 | Wellinitz | 60/264 |
| 3,899,923 | 8/1975 | Teller | 60/39.5 |
| 3,970,252 | 7/1976 | Smale et al. | 239/127.3 |
| 3,981,143 | 9/1976 | Ross et al. | 60/39.5 |
| 3,981,448 | 9/1976 | Demogenes et al. | 239/127.3 |
| 4,055,044 | 10/1977 | Dederra et al. | 239/127.3 |
| 4,355,507 | 10/1982 | Coffey et al. | 239/127.3 |
| 4,369,920 | 1/1983 | Schmidt | 239/127.3 |
| 4,630,683 | 12/1986 | Allan | 60/39.5 |
| 4,800,718 | 1/1989 | Zimmerman | 60/264 |
| 5,056,307 | 10/1991 | Liang | 60/226.1 |

FOREIGN PATENT DOCUMENTS 2132279 7/1984 United Kingdom ............ 239/127.3

*Primary Examiner*—Richard A. Bertsch
*Assistant Examiner*—Howard R. Richman
*Attorney, Agent, or Firm*—Harold E. Meier

[57] ABSTRACT

There is described a method and apparatus for reducing the infrared emissions from a tail-pipe section of a jet engine. The apparatus consists of a plurality of overlapping hollow panels each having a truncated cone shape supplied with a liquid coolant such that the coolant absorbs heat from the surfaces of the panels and converts the liquid to a vapor. The vapor created by this heat absorption is injected from an end opening of a panel between the panels and the exhaust gases of the jet engine to form a boundary layer. Surrounding the panels is an outer cowling defining a chamber with the overlapping panels and containing a liquid coolant.

9 Claims, 3 Drawing Sheets

METHOD AND APPARATUS FOR CONTROLLING INFRARED EMISSIONS

TECHNICAL FIELD

This invention relates to the reduction of infrared emissions, and more particularly to the reduction of infrared emissions from the surface of an exhaust pipe or cone of a jet engine.

BACKGROUND OF THE INVENTION

Vulnerability to infrared seeking missiles currently constitute a serious threat to military aircraft. The aircraft is most vulnerable to attack from surface-to-air and air-to-air infrared guided missiles during takeoff and landing when the infrared emissions from the aircraft are highest.

Past methods used to reduce infrared emissions from aircraft engines have included low-emissivity coatings, shielding of heat emitting surfaces, blocking of the jet exhaust by use of a centerbody air-cooled plenum, injecting various coolants into the engine combustion chambers and using engine fan bypass air to cool tail pipe surfaces. These solutions have all proved unsatisfactory for a variety of reasons.

Low emissivity coatings on jet aircraft engines have limited capability to reduce IR emissions and have been shown to have limited durability. The high temperatures generated on the tail pipe surfaces of a jet engine can quickly degrade the performance of a low emissivity coating and limit its effective operating characteristics. The shielding of heat emitting surfaces of an aircraft engine has proved to be unsatisfactory because the additional weight added to the aircraft engine limits aircraft payload. Also shielding is aerodynamically unsuitable for some types of high performance aircraft. The use of blocking methods causes serious degradation in engine performance due to the increased tail-pipe back pressure. The use of coolants within the jet engine combustion chamber requires the use of excessive quantities of water, therefore reducing aircraft payload and engine performance. Finally, the use of engine fan bypass air reduces the performance of the jet engine as a function of the percentage of bypass air directed at the tail-pipe surfaces. None of these methods, used alone or in combination, were able to provide adequate protection from infrared guided missile systems.

Current infrared countermeasure systems include the use of pyrotechnics and infrared jamming systems. Pyrotechnics consist of flares or other high-heat source projectiles that are ejected from the aircraft in an attempt to mask the infrared emissions of the aircraft engine. Pyrotechnics are not routinely available because they may not always be dispensed during the critical takeoff and landing periods due to their adverse impact on the environment and their potential hazardous effects on populated areas.

Infrared jamming systems while effective are costly and may significantly impact aircraft performance due to the weight and input power requirements of the system. These factors are particularly important for large aircraft during takeoff and landing operations when degraded engine performance cannot be tolerated and engine infrared emissivity is highest.

Therefore, a need has arisen for an apparatus and method that significantly reduces infrared emissivity of the tail-pipe surfaces of a jet engine and has limited impact on engine performance.

SUMMARY OF THE INVENTION

The present invention overcomes these and other problems with a method and apparatus for reducing the infrared emissions of a jet engine tail-pipe surface. The infrared emissions of the tail-pipe surfaces of a jet engine are reduced by passing a liquid coolant mixture through tail-pipe surfaces While passing through the heated surfaces, the coolant mixture removes heat from the surfaces of the tail-pipe by the process of conduction. The heat causes the coolant mixture to vaporize, further cooling the heated surfaces of the engine tail-pipe.

The vaporous coolant is injected along the interior surfaces of the engine tail-pipe to form a vaporous layer between the metal of the tail-pipe and the exhaust gases. The combination of conduction, transpiration and boundary layer protection processes allows the metal surfaces adjacent to the exhaust gases to maintain a temperature near the boiling point of the liquid coolant. The reduction in heat of the metal surfaces of the exhaust tail-pipe will significantly reduce the infrared emission from the aircraft as heat emissions from the aircraft exhaust tail-pipe are a primary source of infrared emissions.

BRIEF DESCRIPTION OF THE DRAWINGS

For a more complete understanding of the present invention and the advantages thereof, reference is now made to the following detailed description taken in conjunction with the accompanying drawings in which.

DETAILED DESCRIPTION OF THE INVENTION

Figure 1:
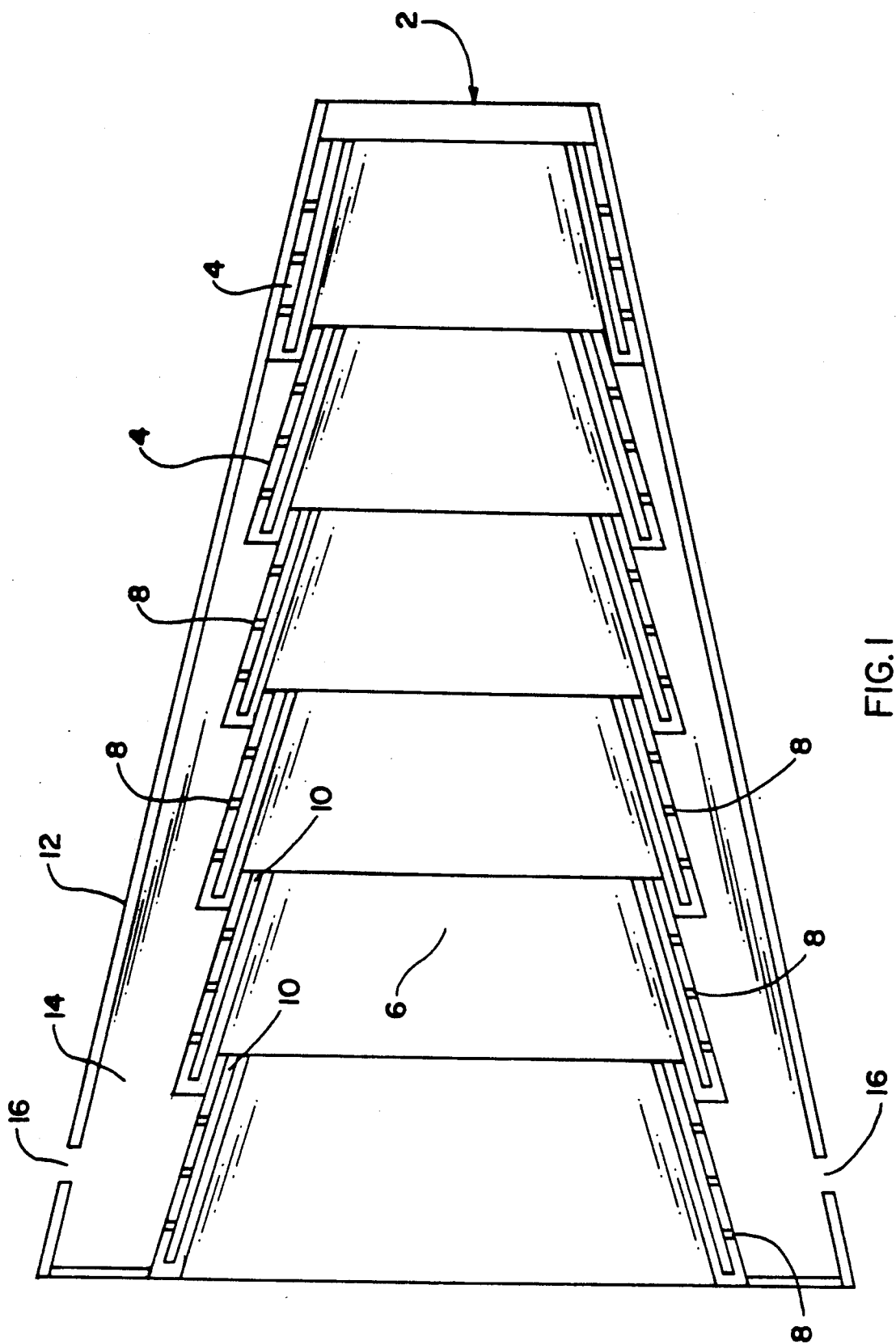
FIG. 1 is a cross-sectional view of one embodiment of the infrared emissions reduction system of the present invention.
Figure 2:
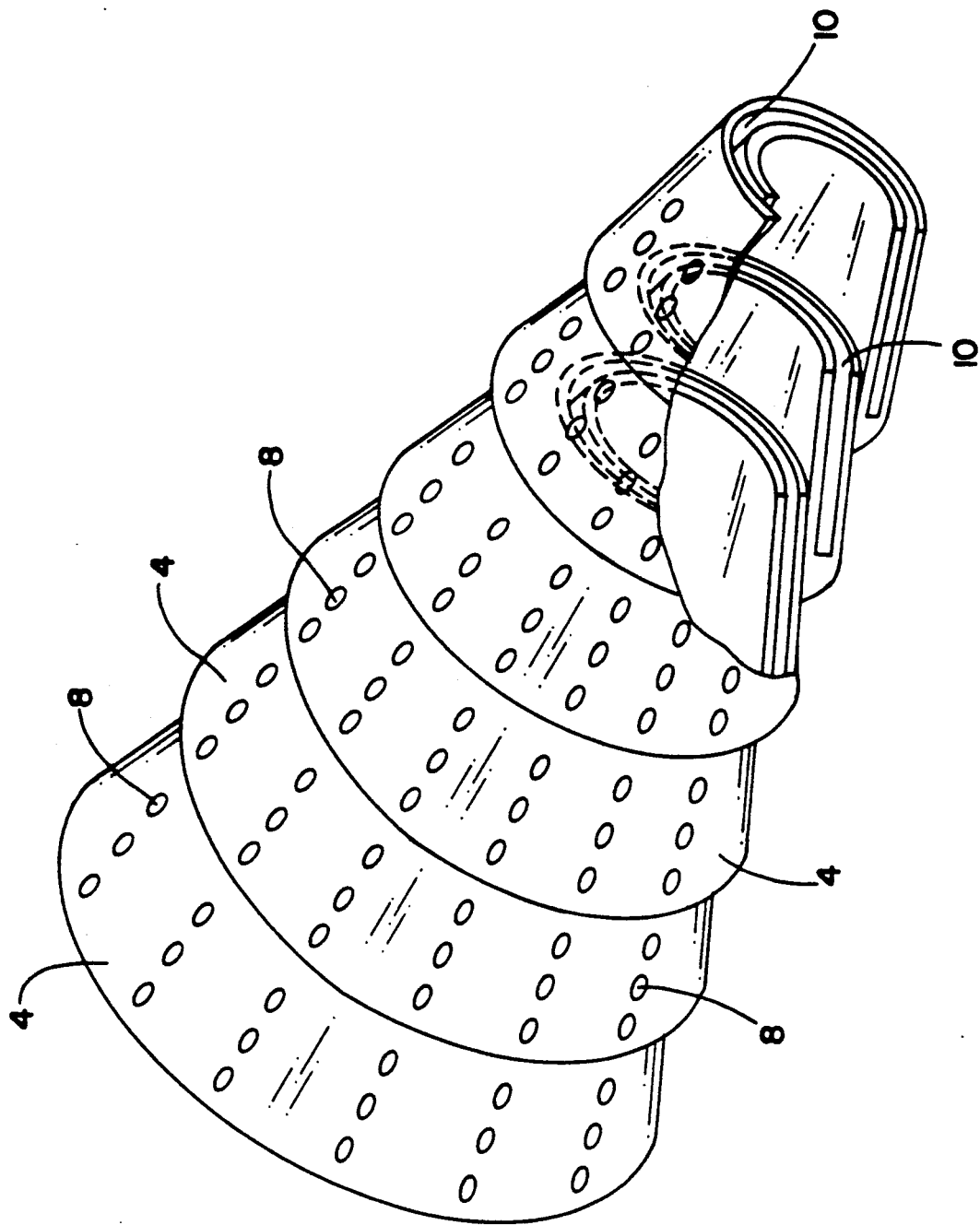
FIG. 2 is a perspective view of the infrared emissions reduction system.

Referring now to the drawings, and more particularly to FIGS. 1 and 2, there is shown an illustration of one embodiment of the present invention. The tail-pipe assembly 2 is constructed of a plurality of panels 4 having a truncated cone shape which overlap to enclose the tail-pipe exhaust chamber 6. The panels 4 may be constructed of any material commonly used in aircraft engine construction. The panels 4 are hollow in construction and contain a number of metering holes 8 on the exterior side. The panels 4 also contain an outlet port 10 at the aft end of the panel.

The hollow construction of the panels 4 permits the conduction of a liquid coolant mixture through the panel. Surrounding the overlapping panels 4 is a tail-pipe cowling 12. The cowling 12 engages the overlapping panels at the front and rear ends to define a liquid coolant chamber 14. The liquid coolant chamber 14 supplies coolant to the metering holes 8 of the panels 4. The surface of the cowling 12 contains one or more openings 16 for receiving a liquid coolant mixture from a supply means (not shown).

Figure 3:
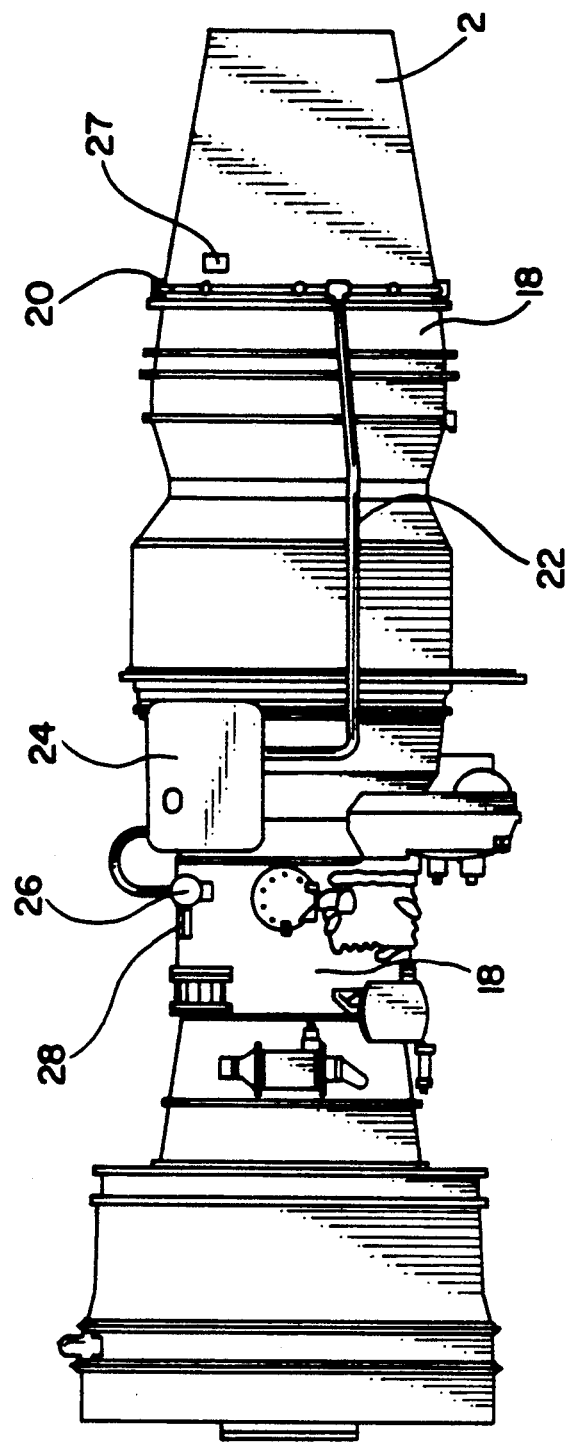
FIG. 3 is an exterior view of a jet aircraft engine equipped with the emissions reduction system of the present invention.

Referring now to FIG. 3, wherein there is shown a jet engine utilizing the infrared emission reducing system of the present invention. The tail-pipe assembly 2 engages the rearmost portion of a turbo fan engine 18. Connected to the forward end of the tail-pipe assembly 2 is a coolant manifold 20 communicating with each of the openings 16 on the tail-pipe cowling 12. A liquid coolant mixture is supplied to the coolant manifold 20 by means of a coolant line 22 running between the coolant manifold 20 and the liquid coolant reservoir 24. The liquid coolant mixture may be water or water mixed with a coolant such as antifreeze.

The reservoir 24 supplies coolant to the tail-pipe assembly 2 and is regulated by the pressure maintained within the coolant reservoir 24. The pressure of the coolant reservoir 24 is controlled by means of a control valve 26. A pressure source such as a bleed-air supply 28 is connected to the reservoir 24 through the control valve 26 to pressurize the reservoir 24 at a higher level than the exhaust gasses. The control valve 26 may be connected to a detection means 27 monitoring the surface temperature of the tail-pipe assembly 2 such that an increase in temperature of the tail-pipe assembly 2 causes the control valve to open and increase the flow of coolant to the tail-pipe assembly 2.

The invention operates in the following manner. Coolant flows from the liquid coolant reservoir 24 through the coolant line 22 to the liquid coolant manifold 20. The manifold 20 supplies liquid coolant to each of the openings 16 on the tail-pipe cowling 12. The coolant fills the coolant chamber 14 within the tail-pipe assembly 2. Coolant within the coolant chamber 14 passes through the metering holes 8 on the exterior surface of the overlapping panels 4 to fill the cavity of each panel.

Coolant inside of the panels 4 absorbs heat from the interior surfaces of the panels by means of conduction. Eventually, the liquid coolant transpires to a vaporous state and draws off additional heat from the surfaces of the panels 4. The vaporous coolant exits from the panels 4 through the outlet port 10 at the aft end of the panel.

The vaporous coolant exiting from each of the panels 4 forms a vaporous boundary layer between the metal surface of the tail-cone assembly 2 and the exhaust gases (not shown) of the jet engine. The boundary layer further controls heating of the inner surfaces of the panels 4 and effectively maintains the surface temperature of the panels at or near the boiling point of the coolant.

The reduction of temperature within the tail-cone assembly 2 directly effects the infrared emissivity of the jet engine. According to Boltzmann's Law, the emissivity of a surface is proportional to the fourth power of its absolute temperature. Thus, a relatively small change in temperature results in a large change in the radiant emittance of a surface area. Therefore, the reduction of the temperature of the surface of the tail-cone assembly 2 from the temperature of the aircraft exhaust to the boiling point of the coolant reduces the infrared emissivity of the engine.

Although a preferred embodiment of the invention has been illustrated in the accompanying drawing and described in the foregoing detailed description, it will be understood that the invention is not limited to the embodiment disclosed, but is capable of numerous rearrangements and modifications of parts and elements without departing from the spirit of the invention.

I claim:

1. A method for reducing infrared emissions from a tail pipe of a jet engine comprising the steps of:
   supplying a liquid coolant to a panel emitting infrared radiation to reduce the temperature of the panel by conduction, the panel forming a part of the tail pipe;
   transforming the coolant into a vapor while the coolant passes through the panel to further reduce the temperature of the panel by transpiration;
   injecting coolant vapor from the panel along the interior surface of an exhaust chamber of the tail pipe and exhaust gases of the jet engine; and
   controlling the supply of liquid coolant to the panel in response to the temperature of the tail pipe.

2. An exhaust-pipe assembly for reducing the infrared emissions from a jet engine comprising:
   a plurality of overlapping panels defining an interior of an exhaust chamber;
   a cowling surrounding the panels, said cowling defining a coolant chamber with the panels;
   each of said panels comprising:
     an exterior shell defining a hollow interior extending substantially the length and width of the panel;
     one or more metering holes along the outside surface of the shell enabling coolant to flow from the coolant chamber into the hollow interior of the panel where the coolant transpires to a vapor;
     an outlet at an aft end of the panel enabling coolant vapor to flow from the panel along the inner surface of the exhaust chamber, said coolant vapor forming a boundary layer between the panels and jet engine exhaust gases; and
   means for supplying a liquid coolant to the coolant chamber.

3. The exhaust-pipe assembly of claim 2, wherein the means for supplying further includes a coolant manifold connected to the cowling and communicating with the coolant chamber.

4. The exhaust-pipe assembly of claim 3, further including a coolant reservoir connected to the coolant manifold.

5. The exhaust-pipe assembly of claim 4, further including means for maintaining pressure within the coolant reservoir greater than pressure of the jet engine exhaust gases.

6. The exhaust-pipe assembly of claim 5, wherein the means for maintaining pressure responds to the surface temperature of the exhaust-pipe.

7. An exhaust pipe assembly for reducing the infrared emissions of a jet engine exhaust pipe comprising:
   a plurality of overlapping panels defining an exhaust chamber, said panels having a hollow interior;
   a cowling surrounding the panels, said cowling defining a coolant chamber with the panels;
   a coolant reservoir for supplying a coolant to the coolant chamber; and
   means responsive to the surface temperature of the exhaust pipe for maintaining pressure within the coolant reservoir.

8. The exhaust pipe assembly of claim 7, wherein the panels having a hollow interior further comprise:
   one or more metering holes along one surface of the panels for allowing coolant to flow from the coolant chamber into the hollow interior of the panels where the coolant transpires to a vapor; and
   an outlet at an aft end of each panel for allowing coolant vapor to flow from the panel along the inner surface of the exhaust chamber, said coolant vapor forming a boundary layer between the panels and the jet engine exhaust gases.

9. The exhaust pipe assembly of claim 7, further including a coolant manifold connecting the coolant reservoir to the cowling for supplying coolant to the coolant chamber.

* * * * *